United States Patent Office 3,365,374
Patented Jan. 23, 1968

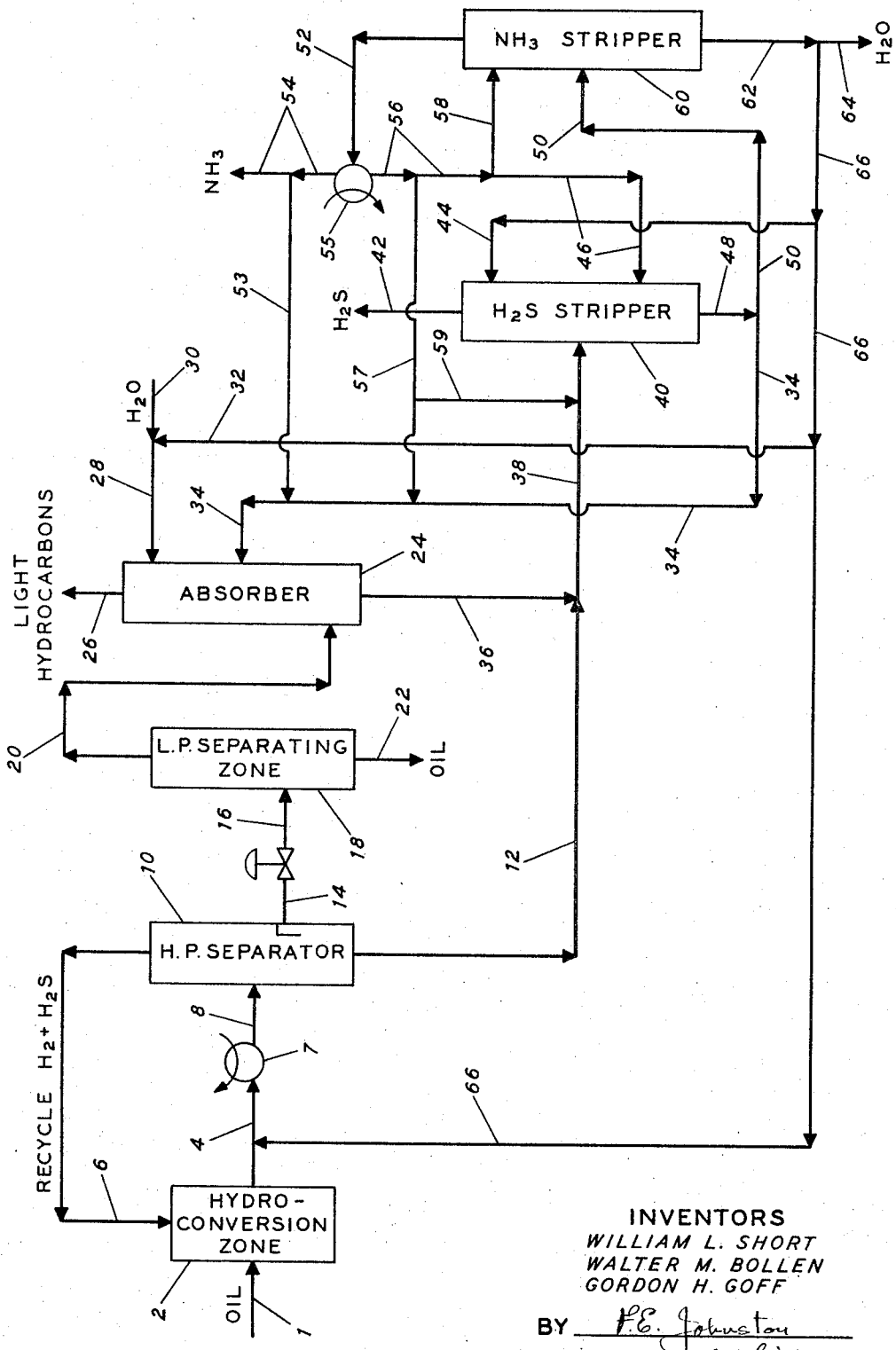

3,365,374
H₂S RECOVERY BY ABSORPTION AND PLURAL DISTILLATION
William L. Short and Walter M. Bollen, San Rafael, and Gordon H. Goff, Lafayette, Calif., assignors to Chevron Research Company, San Francisco, Calif., a corporation of Delaware
Continuation-in-part of application Ser. No. 368,671, May 10, 1964, which is a continuation-in-part of application Ser. No. 296,323, July 19, 1963. This application June 7, 1967, Ser. No. 644,334
9 Claims. (Cl. 203—42)

ABSTRACT OF THE DISCLOSURE

In a process where H₂S is formed in a hydroconversion zone and the effluent from the hydroconversion zone is first passed to a high pressure separator and liquid oil from the high pressure separator is next passed to substantially lower pressure separating means, the improvement in recovering H₂S which comprises:

(a) Absorbing H₂S contained in vapor phase effluent from the low pressure separating means by contacting the effluent with an NH₃-rich aqueous bottoms solution to obtain an NH₃-H₂S-rich aqueous solution;

(b) Distilling the NH₃-H₂S-rich aqueous solution in a first distillation column to obtain as overhead an H₂S-rich vapor and as bottoms the NH₃-rich aqueous bottoms solution, part of which is used to scrub the hydroconversion zone effluent;

(c) Distilling the remaining part of the NH₃-rich aqueous bottoms solution in a second distillation column to obtain an NH₃-rich vapor overhead;

(d) Partially condensing the NH₃-rich vapor overhead to obtain and NH₃-rich vapor and an NH₃-rich aqueous overhead solution; and (e) Recycling the NH₃-rich aqueous overhead solution to the first distillation column.

*Cross references*

This application is a continuation-in-part of our co-pending application Ser. No. 368,671, filed May 10, 1964, which in turn is a continuation-in-part of our application Ser. No. 292,323, filed July 19, 1963, and now abandoned.

*Background of the invention*

1. FIELD OF THE INVENTION

This invention relates to processes wherein a hydrocarbon oil containing sulfur compounds and/or nitrogen compounds is contacted with hydrogen at reaction conditions whereby hydrogen reacts with said compounds to form by-product H₂S and NH₃ and there is obtained a process stream mixture comprising hydrogen, liquid hydrocarbons, H₂S and NH₃. More particularly, the invention relates to methods for recovering the H₂S formed in the process.

2. DESCRIPTION OF THE PRIOR ART

In many hydroconversion processes applied to hydrocarbon oils, shale oil, tar sands, etc. of which catalytic hydrogenation, hydrofining or hydrodesulfurization and hydrocracking are typical examples, H₂S and NH₃ are produced as a result of reaction of hydrogen with sulfur compounds and nitrogen compounds contained in the oil. Sometimes this conversion of one or the other or both of the sulfur and nitrogen compounds is the desired reaction, while in other cases it is merely an incidental reaction. In a typical process, normally liquid hydrocarbon oil containing nitrogen compounds and sulfur compounds and recycle hydrogen-rich gas and makeup hydrogen are passed through a reaction zone, usually containing a catalyst, at elevated temperature and pressure at which at least a portion of the hydrocarbons are vaporized; and there is obtained as a reaction zone effluent a mixture of vaporized hydrocarbons, hydrogen, H₂S and NH₃. The effluent may also contain heavier hydrocarbons which are liquid at the reaction conditions. The reaction effluent is cooled to condense vaporized hydrocarbons, whereby the liquid hydrocarbons can then be separated from hydrogen-rich recycle gas, which is then reused in the process.

The removal of NH₃ and H₂S from hydroconversion effluent streams may be accomplished by contacting with water, preferably at pressures above atmospheric pressure and at low temperature. To obtain the desired extent of removal, however, it is often necessary to use a rather large amount of water so that a dilute aqueous solution of NH₃ and H₂S is formed. It has been the practice to form solutions so dilute that they can be disposed of as waste waters by discharging into bays, estuaries, rivers, lakes, streams and ponds. With increasing urbanization and concentration of industrial complexes, however, the situation is rapidly developing where such pollution of water near population centers will no longer be tolerated. The refiner is thus put to considerable expense to dispose of such waste waters either by extreme dilution or by biological oxidation or like treating processes to render the contaminating NH₃ and H₂S innocuous to marine life.

It is not possible to recover high yields of high purity NH₃ and H₂S by simple distillation of aqueous solutions which contain H₂S in addition to NH₃. A stripping type of distillation can be carried out to remove a portion of the H₂S from the solution; but, as the residual H₂S concentration in the remaining liquid decreases, a limiting minimum ratio of H₂S to NH₃ is soon reached at which the relative volatility of H₂S to NH₃ is unity; and no further separation between NH₃ and H₂S by distillation is possible. The solution still contains nearly all of the NH₃ and a substantial contaminating amount of H₂S. For example, we have found that even at 450° F. the limiting minimum weight ratio of H₂S to NH₃ is above 0.04. At lower temperatures, the minimum weight ratio is greater. It does not appear that the H₂S and NH₃ can be separated in this way at any feasible temperature.

Our application Ser. No. 368,671 claims an ammonia recovery process which encompasses H₂S recovery. The present application is directed more specifically to improved H₂S recovery and, still more specifically, to H₂S recovery from a particular hydroconversion zone effluent stream.

The process claimed in Ser. No. 368,671 is for recovering high purity ammonia from an aqueous solution containing both NH₃ and H₂S, in a distillation zone, which comprises:

(1a) Stripping said solution in the distillation zone at superatmospheric pressure to form hot upflowing vapors comprising water, NH₃ and H₂S, which vapors are contacted countercurrently therein with downflowing colder liquid water, (1b) Withdrawing overhead vapor from the distillation zone, said vapor comprising H₂S essentially free of NH₃, (1c) Withdrawing bottoms liquid from the distillation zone, said liquid comprising essentially water containing substantially less NH₃ and H₂S than said solution, and (1d) Thereby forming an intermediate vapor stream comprising water, NH₃ and H₂S, containing more NH₃ than H₂S on a weight basis;

(2) Withdrawing and treating said intermediate vapor stream as by partial condensation to form an NH₃-enriched vapor stream of controlled water content having a higher concentration of $NH_3$ than said intermediate vapor stream, returning the resulting condensate to the distillation zone; and (3) Partially condensing said $NH_3$-enriched vapor stream to form an uncondensed portion comprising $NH_3$ vapors essentially free of $H_2S$ and a condensed portion comprising water containing more $NH_3$ than $H_2S$ on a weight basis, returning said condensed portion to the distillation zone;

Controlling the water content of the $NH_3$-enriched vapor stream formed by the treatment of the intermediate vapor stream whereby the condensed portion formed by the partial condensation of the $NH_3$-enriched vapor stream dissolves substantially all of the $H_2S$ present in said $NH_3$-enriched vapor stream.

Copending application Ser. No. 356,502 claims a process for removal of $H_2S$ and/or $NH_3$ from reaction effluents. The present invention makes inventive improvement over Ser. No. 356,502, not only by use of a recycle stream from the ammonia stripper to the $H_2S$ stripper, but also by removing the $H_2S$ from a relatively low pressure stream from a hydroconversion zone. However, in some situations, for example, where it is particularly important to have a low concentration of $H_2S$ in the high pressure recycle hydrogen to the hydroconversion reactor, the process claimed in Ser. No. 356,502 may be preferable to the process claimed in the present application.

Summary of the invention

According to the present invention, it has been found that it is advantageous to remove the $H_2S$ formed in a hydroconversion zone by absorbing the $H_2S$ contained in a low pressure vapor phase effluent stream from the hydroconversion process using as the absorbent an $NH_3$-rich aqueous bottoms solution obtained as hereinafter described. In particular, then, according to this invention, $H_2S$ formed in a hydroconversion zone, wherein effluent from the hydroconversion zone is first passed to a high pressure separator and wherein liquid oil from the high pressure separator is next passed to low pressure separating means, is recovered by contacting an $H_2S$-containing vapor phase effluent from, for example, a low pressure separator or a low pressure stripper, with an $NH_3$-rich aqueous bottoms solution to obtain an $NH_3$-$H_2S$-rich aqueous solution.

It has been found that, by scrubbing the $H_2S$ out of the low pressure vapor phase effluent, a gas stream with a very low concentration of $H_2S$ may be obtained. In scrubbing $H_2S$ out of the high pressure vapor phase effluent from a hydroconversion reactor, there is difficulty in absorbing substantially all of the $H_2S$ produced in the hydroconversion reaction. This is mainly due to the fact that, after the high pressure $H_2S$-containing stream is contacted with the aqueous solution, it is cooled and introduced into a high pressure separator. In this high pressure separator, there are three phases—a liquid aqueous phase, a liquid hydrocarbon phase and a vapor phase. Equilibrium, or at least an approach to equilibrium, is obtained amongst these three phases which results in substantial amounts of $H_2S$ being left in the liquid hydrocarbon phase.

The high pressure liquid hydrocarbon phase is next passed to a low pressure separating means, for example distillation columns or a low pressure separator, wherein light gases, such as $H_2S$, methane and ethane, are obtained overhead and heavier hydrocarbons are separated as a liquid phase. Usually it is desirable to use the light hydrocarbons in the refinery fuel system. However, if there is a substantial amount of $H_2S$ in these light gases, then these light gases generally must be treated in an $H_2S$ removal plant for removal of $H_2S$, or diluted with other gases containing substantially less $H_2S$, before they can be used in the refinery fuel system.

In the present invention, this $H_2S$ removal plant is eliminated; but yet light gases suitable (low $H_2S$ content) for use in the refinery fuel system are obtained.

In carrying out the present invention, overhead vapors from an ammonia stripper are partially condensed to yield an ammonia-rich aqueous solution, which is recycled at least in part to an $H_2S$ stripper. Recycling this ammonia-rich aqueous solution to the $H_2S$ stripper not only results in an increased yield of $H_2S$ overhead product from the $H_2S$ stripper, but also results in building up the concentration of ammonia in the bottoms from the $H_2S$ stripper. The ammonia-rich aqueous bottoms from the $H_2S$ stripper thus are particularly suitable for removing $H_2S$ from an $H_2S$-containing stream, because much more $H_2S$ can be absorbed by an aqueous stream of relatively high $NH_3$ concentration as opposed to relatively low $NH_3$ concentration.

Brief description of the drawing

The drawing is a schematic process flow diagram of the process used to recover $H_2S$ and obtain light hydrocarbons having only a low $H_2S$ content.

Detailed description and description of a preferred embodiment

Referring now, in more detail, to the drawing, oil containing organic sulfur is fed in line 1 to the hydroconversion zone 2. The oil is mixed with hydrogen and passed over a hydroconversion catalyst at elevated temperatures and pressures so that organic sulfur is converted to $H_2S$. Effluent from the hydroconversion zone comprising hydrocarbons, hydrogen, $H_2S$ and ammonia is withdrawn in line 4. A small stream of essentially pure water in line 66 is introduced into line 4 to prevent the formation of deposits in exchanger 7, which is used to cool the hydroconversion zone effluent. Although a small amount of $H_2S$ and ammonia will be absorbed by the aqueous stream 66, it is to be noted that in the present process the purpose of stream 66 is primarily to prevent formation of deposits in exchanger 7, not to remove $H_2S$ formed in the hydroconversion zone.

The cooled hydroconversion zone effluent leaves exchanger 7 in line 8 and is introduced into high pressure separator 10. High pressure separator 10 is operated at a pressure between 1,000 and 5,000 p.s.i.g., preferably about 1,500 p.s.i.g., and at temperatures between 100° and 400° F., preferably about 150° F. Recycle hydrogen and $H_2S$ are withdrawn from the top of high pressure separator 10 and recycled in line 6 to hydroconversion zone 2. At pressures in excess of 1,000 p.s.i.g., the majority of the $H_2S$ is usually in the liquid phase in high pressure separator 10. Liquid oil is withdrawn from line 14 and passed after pressure reduction to low pressure separating zone 18 via line 16. Although low pressure separating zone 18 may be, for example, a series of distillation columns or a low pressure separator or a low pressure stripper, it is shown simply as a box. Distillation columns and low pressure separators are conventional as are low pressure strippers with their associated equipment, such as overhead reflux system and bottom stripping vapor systems. If the feed to zone 18 is heated or stripped, the oil withdrawn in line 22 will have a lower $H_2S$ content than the oil will if the feed is merely flashed into a low pressure vessel. Since use of heating means in zone 18, or use of a stripper with its associated equipment as zone 18, will result in a greater capital investment than merely using a low pressure separator as zone 18, the choice will depend largely on what the required $H_2S$ concentration is for the oil withdrawn in line 22 and the overall economics. Pressure in low pressure separating zone 18 is reduced from high pressure separating zone 10 sufficiently so that most of the $H_2S$ flashes out of the low pressure separating liquid oil. The reduced pressure will vary depending on whether distillation or merely a low pressure separator is used in the low pressure separating zone. Thus the pressure will be between 1,000 p.s.i.g.

and atmospheric pressure. Preferably, the pressure is maintained between 75–200 p.s.i.g. in low pressure separating zone 18. In one preferred mode of operation, the liquid hydrocarbon phase from high pressure separating zone 10 is flashed into a low pressure separator vessel (in this instance, zone 18 consists basically of this low pressure separator vessel) maintained at about 100 p.s.i.g. and 120° F.

The $H_2S$-containing vapor phase is withdrawn in line 20 from zone 18 and fed to the bottom of absorber 24. The $H_2S$ is scrubbed out of this vapor phase by an ammonia-rich aqueous solution introduced at an intermediate point in absorber 24 and an essentially pure water stream introduced at the top of absorber 24. Absorber 24 is preferably operated at a bottoms temperature between 110° and 150° F. with one part $H_2S$ to between one and two parts $NH_3$. Light hydrocarbons, such as methane and ethane, are withdrawn from the top of absorber 24 in line 26. The $H_2S$ content of the light hydrocarbons is generally less than 200 p.p.m. $H_2S$ and usually less than 100 p.p.m. Thus, these light hydrocarbons are suitable for use in a refinery fuel system even under very stringent $H_2S$ concentration requirements. For example, in the United States, current local pollution requirements typically require less than about 2 percent $H_2S$ by volume in fuel gases to satisfy $SO_2$ pollution regulations. Japan has even lower requirements for $SO_2$ content of stack gases and requires refinery fuel gas containing less than 0.1 volume percent $H_2S$. Even this low $H_2S$ content requirement is satisfied by the light hydrocarbons withdrawn in line 26, as they typically contain less than 0.02 percent $H_2S$ by volume.

The $H_2S$-$NH_3$-rich aqueous solution formed by scrubbing vapor stream 20 in absorber 24 is withdrawn from the bottom of absorber 24 in line 36 and passed separately or together with an aqueous stream 12 from the bottom of high pressure separator 10 to $H_2S$ stripper 40 via line 38. $H_2S$ is stripped out of the aqueous stream by means of vapors generated in the bottom of $H_2S$ stripper 40 or by means of steam stripping to result in a high purity $H_2S$ overhead product withdrawn in line 42. An ammonia-rich aqueous solution is withdrawn from the bottom of $H_2S$ stripper 40 in line 48 and passed, in part, via line 34 to absorber 24 where it is introduced at an intermediate point. The remaining part is passed in line 50 to ammonia stripper 60 wherein ammonia and $H_2S$ vapor are stripped out of the aqueous solution and withdrawn from ammonia stripper 60 via line 52.

The total overhead from ammonia stripper 60 in line 52 contains, not only ammonia, but also a substantial amount of water and about 5 to 20 percent $H_2S$. Essentially all of this water and $H_2S$ and some $NH_3$ are condensed in exchanger 55 and withdrawn as a liquid phase in line 56. Part of this liquid phase is passed via line 58 to the ammonia stripper 60 to serve as reflux. A small part of the remaining portion may be passed via line 57 to line 34 to aid in maintaining $NH_3$ concentration and balance; most of the remaining portion is recycled via line 46 and/or 59 to the $H_2S$ stripper 40. These streams (46 and 59) help to maintain $H_2S$ balance. The recycle streams in lines 46 and 59 serve to build up the concentration of ammonia in the $H_2S$ stripper bottoms withdrawn in line 48. Thus, the ammonia-rich solution in line 34 is particularly efficient in absorbing $H_2S$ contained in vapor stream 20 introduced to the bottom of absorber 24. Also, because this recycle stream serves to build up the ammonia concentration in line 34, less water is required to recover the $H_2S$ formed in the hydroconversion zone than is required by previously known aqueous scrubbing processes and less heat duty is required than in previous processes which use amine absorbents to remove $H_2S$. High purity $NH_3$ vapor is withdrawn from exchanger 55 as a vapor via line 54. A small stream of ammonia vapor is desirably drawn off of line 54 and passed via line 53 into line 34 to aid in maintaining the ammonia balance in the system.

Essentially pure water is withdrawn from the bottom of ammonia stripper 60 in line 62. This water may be, in part, withdrawn from the process in line 64; but the bulk of the water is passed in header 66. Part of this water is drawn off of line 66 via line 44 and introduced at the top of $H_2S$ stripper 40 to wash down any small amount of ammonia present near the top of $H_2S$ stripper. Another part of the water in line 66 is withdrawn in line 32 and joined with fresh water introduced to the system in line 30. The combined water streams 32 and 30 are then introduced via line 28 into the top of absorber 24 to wash down small traces of ammonia and $H_2S$ near the top of absorber 24. The rest of the water in line 66 is introduced to line 4 as previously explained.

EXAMPLE 1

In this and the following example, stream analyses for the subject invention and comparisons were calculated based on equilibrium flash vaporization, solubility data, material balance, etc.

Hydroconversion zone effluent comprising $H_2$, $NH_3$ and about 3.5 $\overline{M}$ s.c.f.d. of $H_2S$ is contacted with about 13 g.p.m. of fresh water (line 66), cooled and introduced into high pressure separator 10. $H_2$-rich recycle gas is withdrawn from the top of high pressure separator 10 and recycled to the hydroconversion zone. The oil phase withdrawn from the middle of high pressure separator 10 is passed in line 14 to low pressure distillation facilities (zone 18). Overhead gas from zone 18 containing 3.36 $\overline{M}$ s.c.f.d. of $H_2S$ and 2.72 $\overline{M}$ s.c.f.d. of butanes and lighter hydrocarbons are passed in line 20 to absorber 24. The $H_2S$ is scrubbed out of the butanes and lighter hydrocarbons by 271 g.p.m. $NH_3$-rich water containing 6 weight percent $NH_3$ and 1.0 weight percent $H_2S$. This $NH_3$-rich scrubbing water is obtained from the bottom of $H_2S$ stripper 40. Also, about 4 g.p.m. of clean water is fed to the top of absorber 24. Fuel gas out the top of the absorber contains less than 100 p.p.m. $H_2S$.

The following streams are fed to $H_2S$ stripper 40:

|  | G.p.m. | Wt. Percent | |
| --- | --- | --- | --- |
|  |  | $H_2S$ | $NH_3$ |
| (a) $H_2S$ absorber bottoms | 300 | 9.3 | 5.4 |
| (b) Aqueous phase from high pressure separator zone 18 | 14 | 6.7 | 3.6 |
| (c) Aqueous phase from an outside hydroconversion zone | ~10 | ~0.1 | ~0.1 |

Processing these aqueous streams in accordance with the description given under "Detailed Description," 156.2 tons/day of $H_2S$ are obtained from $H_2S$ stripper 40, and 3.1 tons of $NH_3$ are obtained from $NH_3$ stripper 60. The stripped water out the bottom of $NH_3$ stripper 60 amounts to about 56 g.p.m. and contains very little $NH_3$ and $H_2S$.

For comparison, in an alternative method, the off gas from low pressure separating zone 18 is passed to an amine absorbent plant for removal of $H_2S$ from low pressure gases. Such alternative would require an extra capital investment of about $1,000,000 for the amine absorbent plant to process 3.36 $\overline{M}$ s.c.f.d. $H_2S$ and 2.72 $\overline{M}$ s.c.f.d. butanes and lighter hydrocarbons. Since at least some water must be injected ahead of exchanger 7, an aqueous phase in high pressure separator 10 results. A smaller plant can be used to process the aqueous phase from only the high pressure separator; thus, the alternate being compared to the present invention results in savings on the foul water treating plant ($H_2S$ stripper, $NH_3$ stripper, etc.), but not nearly enough to offset the cost of the amine absorbent plant. The net capital savings of the present invention is $600,000 for processing a hydroconversion zone effluent containing about 3.5 $\overline{M}$ s.c.f.d. of $H_2S$.

The operating costs of the hydroconversion zone effluent treating facilities are about $35,000/yr. less than those of the alternate.

To further illustrate the advantages of the present invention, it was compared to another alternate. In this alternate, an $NH_3$-rich aqueous solution is contacted with the hydroconversion zone effluent ahead of the high pressure separator. An amine absorbent plant is still required to remove $H_2S$ from gases separated at low pressure, as more than 10 percent of the $H_2S$ is in the high pressure separator liquid hydrocarbon stream even after contacting with 179 g.p.m. of an $NH_3$-rich aqueous solution. Calculated capital cost in this alternative is $500,000 more than in the invented process, and operating costs are about $36,000/yr. more than in the inverted process.

EXAMPLE 2

The importance of the recycle of $NH_3$ stripper condensed overhead from the $NH_3$ stripper overhead system to the $H_2S$ stripper was determined by analyzing a process wherein $H_2S$ stripper bottom is used to scrub the $H_2S$-containing gas to absorber 24 and wherein there is no recycle of $NH_3$ stripper condensed overhead. In order to obtain the same concentration of $NH_3$ in the $H_2S$ scrubbing solution (line 34), 1,380 lb./hr. of $NH_3$ are required to be introduced into line 34. Of this 1,380 lb./hr. of $NH_3$, about 600 lb./hr. could be recovered by partial condensation of the overhead of an $NH_3$ stripper used to strip that part of the $H_2S$ stripper bottom not passed in line 34 to the $H_2S$ absorber. Thus, 780 lb./hr. of $NH_3$ would have to be brought in from outside the plant. This would cost $292,000/yr. (780 lb./hr.$\times 365 \times 24$ hr./yr.$\times(.95$ op. factor)$\times \$90$/ton$\times 1$ ton/2,000 lb.$=\$292,000$/yr.).

It is to be understood that the forms of the invention shown and described herein are to be taken only as preferred embodiments. Other equivalent means for accomplishing the process steps of the invention will become apparent to those skilled in the art. Accordingly, all such equivalent means and embodiments of the invention that fall within the scope of the claims are intended to be embraced thereby.

We claim:
1. In a process for recovering $H_2S$ formed in a hydroconversion zone, wherein effluent from the hydroconversion zone is first passed to a high pressure separator and wherein liquid oil from said high pressure separator is next passed to low pressure separating means, the improvement which comprises:
    (a) absorbing $H_2S$ contained in vapor phase overhead effluent from said low pressure separating means by contacting the effluent with an $NH_3$-rich aqueous bottoms solution in an absorption zone of an absorber, to obtain an $NH_3$-$H_2S$-rich aqueous bottoms solution;
    (b) distilling said $NH_3$-$H_2S$-rich aqueous bottoms solution in a first stripping distillation column to obtain as overhead an $H_2S$-rich vapor and as bottoms said $NH_3$-rich aqueous bottoms solution, at least part of which is returned to the absorption zone and used to scrub the $H_2S$-containing vapor phase effluent;
    (c) distilling and stripping a remaining part of said $NH_3$-rich aqueous bottoms in a second distillation column to obtain an $NH_3$-rich vapor overhead;
    (d) partially condensing said $NH_3$-rich vapor overhead to obtain an $NH_3$-rich vapor and an $NH_3$-rich aqueous overhead solution; and
    (e) recycling at least a portion of said $NH_3$-rich aqueous overhead solution to said first distillation column.

2. The process according to claim 1 wherein liquid oil in the low pressure separating means is heated so as to result in a liquid oil effluent from the low pressure separating means of reduced $H_2S$ content.

3. Process according to claim 1 wherein said low pressure separating means is a stripper.

4. Process according to claim 1 wherein said low pressure separating means is a low pressure separator vessel.

5. Process according to claim 1 wherein said low pressure separating means is a plurality of distillation columns.

6. The process according to claim 1 wherein the $H_2S$-containing vapor phase effluent from said low pressure separating means is contacted in an absorber with said $NH_3$-rich aqueous bottoms solution and wherein the pressure of the high pressure separator is between 1,000 and 5,000 p.s.i.g. and the pressure of the low pressure separating means is between 1,000 p.s.i.g. and atmospheric pressure and the pressure of the absorber is between 1,000 p.s.i.g. and atmospheric pressure.

7. Process according to claim 1 wherein the $H_2S$-containing vapor phase effluent from said low pressure separating means is introduced into the bottom of the absorber, essentially pure water is introduced into the top of said absorber, said $NH_3$-rich aqueous bottoms solution is introduced into the absorber at an intermediate point, said $NH_3$-$H_2S$-rich aqueous solution is withdrawn from the bottom of the absorber, and light hydrocarbons containing less than 0.1 volume percent $H_2S$ are withdrawn from the top of the absorber.

8. Process according to claim 7 wherein the absorber is operated at a bottoms temperature between 110° and 150° F. and wherein said $H_2S$-rich aqueous solution from the bottom of the absorber has a ratio of ammonia to $H_2S$ of between 1:1 and 2:1.

9. Process according to claim 8 wherein
    (1) a first part of the condensed overhead from the second distillation column is recycled to the first distillation column and fed into the first distillation column at a point intermediate between the bottom and the middle of the first distillation column,
    (2) a second part of the condensed overhead from the second distillation column is recycled to the absorber, and
    (3) at least a part of the $NH_3$-rich vapors from the second distillation column overhead condenser are recycled to the absorber.

References Cited
UNITED STATES PATENTS

| | | | |
|---|---|---|---|
| 1,360,734 | 11/1920 | Doherty | 23—181 |
| 2,431,920 | 12/1947 | Cole | 208—60 |
| 2,878,099 | 3/1959 | Breuing et al. | 23—2 |
| 3,104,959 | 9/1963 | Crosskinsky | 55—73 X |
| 3,159,568 | 12/1964 | Price et al. | 208—89 |

NORMAN YUDKOFF, *Primary Examiner.*

F. E. DRUMMOND, *Assistant Examiner.*